(12) United States Patent
Ranade

(10) Patent No.: US 9,578,094 B1
(45) Date of Patent: Feb. 21, 2017

(54) PLATFORM AND GAME AGNOSTIC SOCIAL GRAPH

(71) Applicant: Kabam, Inc., San Francisco, CA (US)

(72) Inventor: Amit Ranade, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 202 days.

(21) Appl. No.: 13/705,034

(22) Filed: Dec. 4, 2012

Related U.S. Application Data

(60) Provisional application No. 61/577,398, filed on Dec. 19, 2011.

(51) Int. Cl.
*G06F 15/16* (2006.01)
*H04L 29/08* (2006.01)
(Continued)

(52) U.S. Cl.
CPC ............. *H04L 67/104* (2013.01); *G06Q 50/01* (2013.01); *A63F 13/12* (2013.01); *A63F 13/335* (2014.09); *A63F 13/795* (2014.09); *A63F 13/87* (2014.09); *A63F 2300/556* (2013.01); *H04L 51/046* (2013.01); *H04L 51/32* (2013.01); *H04L 65/403* (2013.01); *H04L 67/22* (2013.01); *H04L 67/306* (2013.01)

(58) Field of Classification Search
CPC ...... H04L 67/104; H04L 67/22; H04L 67/306; H04L 51/046; H04L 51/32; H04L 65/403; A63F 13/87; A63F 13/12; A63F 13/335; A63F 13/795; A63F 2300/556; G06Q 50/01
USPC .............................. 709/206, 204; 463/42, 40
See application file for complete search history.

(56) References Cited

U.S. PATENT DOCUMENTS 6,951,516 B1 10/2005 Eguchi et al. .................. 463/40
7,056,217 B1  6/2006 Pelkey et al. ................... 463/43
(Continued)

FOREIGN PATENT DOCUMENTS

CN  101635641  1/2010
CN  101715586  5/2010
(Continued)

OTHER PUBLICATIONS

"Buddy Rush:: The World's Best Cross-platform RPG!", http://budcaush.solimo.com/, printed Nov. 28, 2011, copyright 2011 by Team Sollmo with Company 11, Inc., 2 pages.
(Continued)

*Primary Examiner* — Jungwon Chang
(74) *Attorney, Agent, or Firm* — Sheppard Mullin Richter & Hampton LLP

(57) ABSTRACT

Social graphs may be determined for individual users belonging to affiliations in virtual spaces accessible via electronic social networks. Affiliations within one or more virtual spaces may be managed. A given affiliation within a given virtual space may comprise a discrete group of users with a relationship having a functional significance within the given virtual space. Relationships within one or more electronic social network may be managed. A given relationship within a given electronic social network may represent a reciprocal relation between two or more users in the given electronic social network. Social graphs associated with individual users may be determined based on the affiliations within the one or more virtual spaces and the relationships within the one or more electronic social networks.

12 Claims, 3 Drawing Sheets

(51) Int. Cl.
*G06Q 50/00* (2012.01)
*A63F 13/87* (2014.01)
*A63F 13/30* (2014.01)
*A63F 13/335* (2014.01)
*A63F 13/795* (2014.01)
*H04L 12/58* (2006.01)
*H04L 29/06* (2006.01)

(56) References Cited

U.S. PATENT DOCUMENTS

| | | | |
|---|---|---|---|
| 7,522,058 B1 | 4/2009 | Light et al. | 340/573.1 |
| 7,707,122 B2 * | 4/2010 | Hull et al. | 705/319 |
| 7,780,530 B2 | 8/2010 | Ushiro et al. | 463/42 |
| 7,856,471 B2 | 12/2010 | Pounds | |
| 7,970,712 B2 * | 6/2011 | Ruvolo et al. | 705/319 |
| 8,137,193 B1 | 3/2012 | Kelly et al. | 463/31 |
| 8,137,194 B1 | 3/2012 | Kelly et al. | 463/31 |
| 8,214,487 B2 | 7/2012 | Savoor et al. | 709/224 |
| 8,257,174 B2 | 9/2012 | Pincus et al. | 463/31 |
| 8,332,488 B1 | 12/2012 | Dale | |
| 8,347,225 B2 | 1/2013 | Blinnikka et al. | 715/787 |
| 8,347,322 B1 | 1/2013 | Brown et al. | 719/328 |
| 8,353,760 B2 | 1/2013 | Ocko et al. | 463/25 |
| 8,622,828 B1 | 1/2014 | Harrington | 463/31 |
| 8,663,004 B1 | 3/2014 | Xu | 463/29 |
| 8,734,243 B2 | 5/2014 | Harrington | 463/29 |
| 8,843,557 B2 | 9/2014 | Ranade | 709/204 |
| 8,868,655 B2 | 10/2014 | Ranade | 709/204 |
| 8,881,181 B1 | 11/2014 | Harrington | 719/328 |
| 8,984,541 B1 | 3/2015 | Brown | |
| 8,986,116 B1 | 3/2015 | Harrington | 463/29 |
| 9,011,242 B2 | 4/2015 | Xu | |
| 9,116,732 B1 | 8/2015 | Harrington | |
| 9,223,599 B1 | 12/2015 | Racanelli | |
| 2003/0078960 A1 | 4/2003 | Murren et al. | 709/203 |
| 2003/0177187 A1 | 9/2003 | Levine | |
| 2004/0117386 A1 | 6/2004 | Lavender et al. | 707/100 |
| 2005/0245317 A1 | 11/2005 | Arthur | |
| 2005/0272504 A1 | 12/2005 | Eguchi et al. | 463/40 |
| 2006/0121986 A1 | 6/2006 | Pelkey et al. | 463/40 |
| 2006/0287099 A1 | 12/2006 | Shaw | |
| 2007/0150603 A1 | 6/2007 | Crull et al. | 709/227 |
| 2007/0173324 A1 | 7/2007 | Multerer | |
| 2007/0233736 A1 | 10/2007 | Xiong et al. | 707/104.1 |
| 2007/0274460 A1 | 11/2007 | Shaffer et al. | 379/37 |
| 2008/0119277 A1 | 5/2008 | Thelen | 463/42 |
| 2008/0134035 A1 | 6/2008 | Pennington et al. | 715/713 |
| 2008/0187143 A1 | 8/2008 | Mak-Fan | 381/17 |
| 2009/0034696 A1 | 2/2009 | Ramanathan | 379/88.17 |
| 2009/0112989 A1 | 4/2009 | Anderson et al. | 709/204 |
| 2009/0144075 A1 | 6/2009 | Flinn et al. | 705/1 |
| 2009/0172795 A1 | 7/2009 | Ritari et al. | 726/7 |
| 2009/0197681 A1 | 8/2009 | Krishnamoorthy et al. | 463/42 |
| 2009/0197881 A1 | 8/2009 | Kugimiya | |
| 2009/0199275 A1 | 8/2009 | Brock | |
| 2009/0292814 A1 | 11/2009 | Ting | |
| 2009/0325712 A1 | 12/2009 | Rance | 463/42 |
| 2009/0327232 A1 | 12/2009 | Carter et al. | 707/3 |
| 2009/0327427 A1 | 12/2009 | Mathew et al. | 709/206 |
| 2009/0327882 A1 | 12/2009 | Velusamy | 715/269 |
| 2010/0024015 A1 | 1/2010 | Hardt | 726/6 |
| 2010/0063969 A1 | 3/2010 | Kasargod et al. | 707/740 |
| 2010/0106782 A1 | 4/2010 | Huang et al. | 709/206 |
| 2010/0146118 A1 * | 6/2010 | Wie | 709/225 |
| 2010/0169798 A1 | 7/2010 | Hyndman et al. | 715/757 |
| 2010/0197409 A1 | 8/2010 | Van Luchene | 463/42 |
| 2010/0216553 A1 | 8/2010 | Chudley et al. | 463/42 |
| 2010/0228617 A1 | 9/2010 | Ransom et al. | 705/14.25 |
| 2010/0229106 A1 | 9/2010 | Lee et al. | 715/757 |
| 2010/0235754 A1 | 9/2010 | Leitheiser | 715/742 |
| 2010/0274815 A1 | 10/2010 | Vanasco | |
| 2010/0304862 A1 | 12/2010 | Coleman et al. | 463/32 |
| 2010/0312820 A1 | 12/2010 | Goffinet | |
| 2011/0014972 A1 | 1/2011 | Herrmann et al. | 463/25 |
| 2011/0016488 A1 | 1/2011 | Athias | 725/53 |
| 2011/0022450 A1 | 1/2011 | Meredith | 705/14.4 |
| 2011/0023101 A1 | 1/2011 | Vernal | |
| 2011/0107239 A1 | 5/2011 | Adoni et al. | 715/757 |
| 2011/0131508 A1 | 6/2011 | Gershfang et al. | 715/757 |
| 2011/0151976 A1 | 6/2011 | Holloway et al. | 463/42 |
| 2011/0179161 A1 | 7/2011 | Guy | |
| 2011/0202605 A1 | 8/2011 | Shochet et al. | 709/205 |
| 2011/0212783 A1 | 9/2011 | Dale et al. | 463/42 |
| 2011/0224000 A1 | 9/2011 | Toga | |
| 2011/0237335 A1 | 9/2011 | Holloway et al. | 463/42 |
| 2011/0238608 A1 | 9/2011 | Sathish | 706/47 |
| 2011/0250949 A1 | 10/2011 | Van Os et al. | 463/25 |
| 2011/0251970 A1 | 10/2011 | Oien | |
| 2011/0269548 A1 | 11/2011 | Barclay et al. | 463/42 |
| 2011/0295626 A1 * | 12/2011 | Chen et al. | 705/7.11 |
| 2012/0015739 A1 | 1/2012 | Craine | |
| 2012/0047008 A1 | 2/2012 | Alhadeff et al. | 705/14.16 |
| 2012/0054646 A1 | 3/2012 | Hoomani et al. | 715/758 |
| 2012/0060103 A1 | 3/2012 | Arasaki | |
| 2012/0077523 A1 | 3/2012 | Roumeliotis et al. | 455/456.3 |
| 2012/0094766 A1 | 4/2012 | Reynolds | |
| 2012/0124147 A1 | 5/2012 | Hamlin et al. | 709/206 |
| 2012/0142429 A1 | 6/2012 | Muller | 463/42 |
| 2012/0202587 A1 | 8/2012 | Allen et al. | 463/25 |
| 2012/0227086 A1 | 9/2012 | Dale et al. | 726/3 |
| 2012/0227087 A1 | 9/2012 | Brown | |
| 2012/0244948 A1 | 9/2012 | Dhillon | |
| 2012/0252579 A1 | 10/2012 | Sethi et al. | 463/40 |
| 2012/0254903 A1 | 10/2012 | Brown | |
| 2012/0290949 A1 | 11/2012 | Elenzil et al. | 715/753 |
| 2012/0290950 A1 | 11/2012 | Rapaport | |
| 2012/0324001 A1 * | 12/2012 | Leacock et al. | 709/204 |
| 2013/0005476 A1 | 1/2013 | Keswani et al. | 463/42 |
| 2013/0006736 A1 | 1/2013 | Bethke | |
| 2013/0014033 A1 | 1/2013 | Hamick et al. | 715/757 |
| 2013/0031171 A1 | 1/2013 | Serena | |
| 2013/0073400 A1 | 3/2013 | Heath | |
| 2013/0090170 A1 | 4/2013 | Reed | |
| 2013/0091204 A1 | 4/2013 | Loh | |
| 2013/0091221 A1 | 4/2013 | Bennett | 709/204 |
| 2013/0143669 A1 | 6/2013 | Muller | 463/42 |
| 2013/0151603 A1 | 6/2013 | Lobb | |
| 2013/0151604 A1 | 6/2013 | Ranade | 709/204 |
| 2013/0159430 A1 | 6/2013 | Ranade | 709/206 |
| 2013/0165234 A1 | 6/2013 | Hall | |
| 2013/0172085 A1 | 7/2013 | Harrington | 463/42 |
| 2013/0198275 A1 | 8/2013 | Forsblom | |
| 2013/0212191 A1 | 8/2013 | Suraj | |
| 2013/0282828 A1 * | 10/2013 | Lawler et al. | 709/204 |
| 2013/0326368 A1 | 12/2013 | Voas | |
| 2013/0332825 A1 | 12/2013 | Singh | |
| 2014/0179434 A1 | 6/2014 | Xu | 463/31 |
| 2014/0187333 A1 * | 7/2014 | Craine et al. | 463/42 |

FOREIGN PATENT DOCUMENTS

| | | |
|---|---|---|
| CN | 102185789 | 9/2011 |
| EP | 2 383 683 | 11/2011 |
| WO | 2008144412 | 1/2008 |
| WO | 2010025343 | 1/2010 |
| WO | 2013086268 | 6/2013 |
| WO | 2013096261 | 6/2013 |
| WO | WO 2013/086268 | 6/2013 |
| WO | WO 2013/096261 | 6/2013 |
| WO | 2013103655 | 7/2013 |
| WO | WO 2013/103655 | 7/2013 |

OTHER PUBLICATIONS

Johnson, Ken, VSCpr for GREE Inc., "GREE Gaming Platform Provides Global User Base for All Developers. New Platform Offers Unified Social Gaming System", Burlingame, CA, PRWeb, Dec. 5, 2011, 2 pages.

"FriendFeed", definition from Wikipedia, the free encyclopedia, printed Nov. 28, 2011, 3 pages.

Webster, Andrew, "Social games need to become truly cross-platform", http://www.gamezebo.com/news/2011/06/08/social-

(56) References Cited

OTHER PUBLICATIONS games-need-become-truly-cross-platform, posted Jun. 8, 2011, printed Nov. 28, 2011, 2 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, printed Nov. 28, 2011, 2 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, 4 pages.

\* cited by examiner

PLATFORM AND GAME AGNOSTIC SOCIAL GRAPH

FIELD OF THE DISCLOSURE

This disclosure relates to determining social graphs for individual users belonging to affiliations in virtual spaces accessible via virtual environments including, but not limited to, electronic social networks.

BACKGROUND

Systems exist for forming and/or recognizing affiliations between users of virtual spaces (e.g., video games or other virtual spaces). An affiliation may include an alliance, guild, cohort, and/or other affiliation with a discrete group of users. Typically, however, existing approaches involve affiliations limited to a single virtual space. Furthermore, existing systems do not incorporate both affiliations in virtual spaces and relationships in social networks when determining a social graph for a given user.

SUMMARY

One aspect of the disclosure relates to a system configured to a system configured to determine social graphs for individual users belonging to affiliations in virtual spaces accessible via virtual environments, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more than one virtual space. The affiliations in different virtual spaces, which include substantially the same group of users, may be encompassed by an overarching affiliation. Social graphs associated with individual users may be determined based on the affiliations within one or more virtual spaces as well as relationships within one or more electronic social networks and/or other virtual environments. In some implementations, social graphs associated with individual users may be determined based on the one or more overarching affiliations. In some implementations, the system may include one or more of at least one virtual environment server, at least one virtual space server, and/or other components.

The virtual environment server may be configured to execute one or more computer program modules. The computer program modules may include one or more of a user module, an environment module, an interaction module, a relationship module, and/or other modules. The user module may be configured to access and/or manage one or more user profiles and/or user information associated with users of the system.

The environment module may be configured to provide one or more virtual environments to users via the client computing platforms. As used herein, a "virtual environment" may include one or more interactive, electronic social media, and/or other virtual environments. Interactive, electronic social media may include one or more of a social network, a virtual space, a micro-blogging service, a blog service (or host), a messaging service, a message board, a forum, and/or other electronically distributed media that are scalable and enable interaction between the users.

The interaction module may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users.

At a given time, interaction module may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module may be configured to establish relationships between users within the virtual environment. Such relationships may include one or more of friendships, connections, followers, social links, and/or other relationships. The relationship module may establish relationships based on relationship requests and acceptances received from users. Relationships may include one or more types of relationships that have a functional purpose or impact within the virtual environment, and/or one or more types of relationships that a social construct within the virtual environment that does not have a functional result.

The virtual space server may be configured to execute one or more computer program modules. The computer program modules may include one or more of a space module, a space account module, a group module, an overarching group module, a communication interface module, a synchronous communications module, an affiliate status module, an asynchronous communications module, a privileges module, an alert module, a broadcast module, and/or other modules.

The space module may be configured to provide one or more virtual spaces to users via client computing platforms. As used herein, a "virtual space" may include one or more social network games and/or other virtual spaces. A virtual space may be provided via a virtual environment provided by the environment module of the virtual environment server. For example, a user may be required to be engaged in a virtual environment in order to engage in a virtual space. According to various implementations, one or more instances of a single given virtual space may be provided via one or more different virtual environments.

The space module may determine views of the virtual space. The views may then be communicated (e.g., via streaming, via object/position data, and/or other information) from the virtual space server to the client computing platforms for presentation to users. The view determined and transmitted to a given client computing platform may correspond to a user character being controlled by a user via the given client computing platform. The view determined and transmitted to a given client computing platform may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., the client computing platforms) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

Within the instance(s) of a virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through the client computing platforms. The users may interact with each other through communications exchanged within the virtual space. Such communications may include one or more of textual chat, instant messages, private messages, voice communications, and/or other communications. Communications may be received and entered by the users via their respective client computing platforms. Communications may be routed to and from the appropriate users through the virtual space server and/or the virtual environment server. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module may be configured to manage accounts associated with the individual users for individual virtual spaces. The accounts may include user information associated with the individual users. Such user information may include one or more of identification information; inventory information; financial information; relationship information; information related to the users determined by one or more other modules; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, the group module may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The overarching group module may be configured to determine one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module may be configured to link affiliations from different virtual spaces to yield an overarching affiliation. Such linking may be performed automatically, manually, and/or by a combination of automatic and manual operations. In some implementations, the overarching group module may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The virtual environment contact module may be configured to manage relationships within one or more electronic social networks and/or other virtual environments. By way of non-limiting example, the relationships may comprise a first relationship within a first electronic social network between the first user and a third user. A given relationship within a given electronic social network or other virtual environment may represent a reciprocal relation between two or more users in the given electronic social network or other virtual network. In some implementations, the virtual environment contact module may be configured to communicate and/or otherwise interface with the relationship module of the virtual environment server to identify relationships within one or more electronic social networks and/or other virtual environments.

The social graph module may be configured to determine social graphs associated with individual users based on the affiliations within the one or more virtual spaces and the relationships within the one or more electronic social networks and/or other virtual environments. Generally speaking, a social graph describes social connections between individuals. By way of non-limiting illustration, a given social graph associated with the first user may represent (1) a connection between the first user and the second user that corresponds to the first affiliation and (2) a connection between the first user and the third user that corresponds to the first relationship. In some implementations, the social graph module may be configured to determine social graphs associated with individual users based on the one or more overarching affiliations. In some implementations, the social graph module may be configured to provide a social graph interface for presentation to a user.

The connection strength module may be configured to determine connection strengths of connections in social graphs based on factors associated with virtual spaces and factors associated with electronic social networks and/or other virtual environment. Exemplary factors are described below. A given connection strength of a given connection representing a relational strength between two users. By way of non-limiting example, a connection strength between the first user and the second user may be determined based on factors associated with the first virtual space, while a connection strength between the first user and the third user may be determined based on factors associated with the first electronic social network. As another example, where the first affiliation within the first virtual space further comprises a fourth user and where the relationships further comprise a second relationship within the first electronic social network between the first user and the fourth user, a connection strength between the first user and the fourth user may be determined based on factors associated with the first virtual space and factors associated with the first electronic social network.

Examples of factors associated with virtual spaces may include one or more of game mechanics, membership to common affiliations, time elapsed since joining an affiliation within a virtual space, privileges within a virtual space, leadership position in an affiliation in a virtual space, status within a virtual space, performance indicators associated with a virtual space, progress indicators associated with a virtual space, average communication frequency within a virtual space, a virtual goods inventory within a virtual space, time spent engaging a virtual space, and/or other factors associated with virtual spaces. Game mechanics may include rules of a game or gameplay associated with a virtual space. Privileges within a virtual space may include special capabilities within the gameplay of a virtual space, special capabilities associated with an affiliation and/or overarching affiliation, and/or other privileges associated with virtual spaces. Performance indicators associated with a virtual space may include an indication of a level of performance of a given user in the virtual space, which may be expressed as a score or other metric. Progress indicators associated with a virtual space may include an indication of a level of progress of a given user in gameplay of the virtual space. Average communication frequency within a virtual space may describe oftenness, regularity, and/or abundance of communications a given user is a party to within communication functionalities of the virtual space.

Examples of factors associated with electronic social networks and/or other virtual environments may include one or more of nature of a relationship within an electronic social network, time elapsed since forming a relationship within an electronic social network, privileges within an electronic social network, status within an electronic social network, average communication frequency within an electronic social network, a virtual goods inventory within an electronic social network, time spent engaging an electronic social network, and/or other factors associated with electronic social networks and/or other virtual environments. A nature of a relationship within an electronic social network may describe one or more of a familial relationship (e.g., sibling, parent, etc.), a social relationship (e.g., friend, teammate, etc.), a romantic relationship (e.g., boy/girl friend, spouse, etc.), a professional relationship (e.g., colleague, associate), and/or other interpersonal relationships. Privileges within an electronic social network may include special capabilities within and/or associated with the electronic social network. Average communication frequency within an electronic social network may describe oftenness, regularity, and/or abundance of communications a given user is a party to within communication functionalities of the electronic social network.

The social graph hierarchy module may be configured to determine hierarchies associated with social graphs based on factors associated with virtual spaces and factors associated with electronic social networks and/or other virtual environments. For example, a hierarchy associated with a social graph of the first user may be determined based on factors associated with the first virtual space and factors associated with the first electronic social network. According to some implementations, a given hierarchy associated with a given social graph may represent a hierarchical order among connections of a given user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
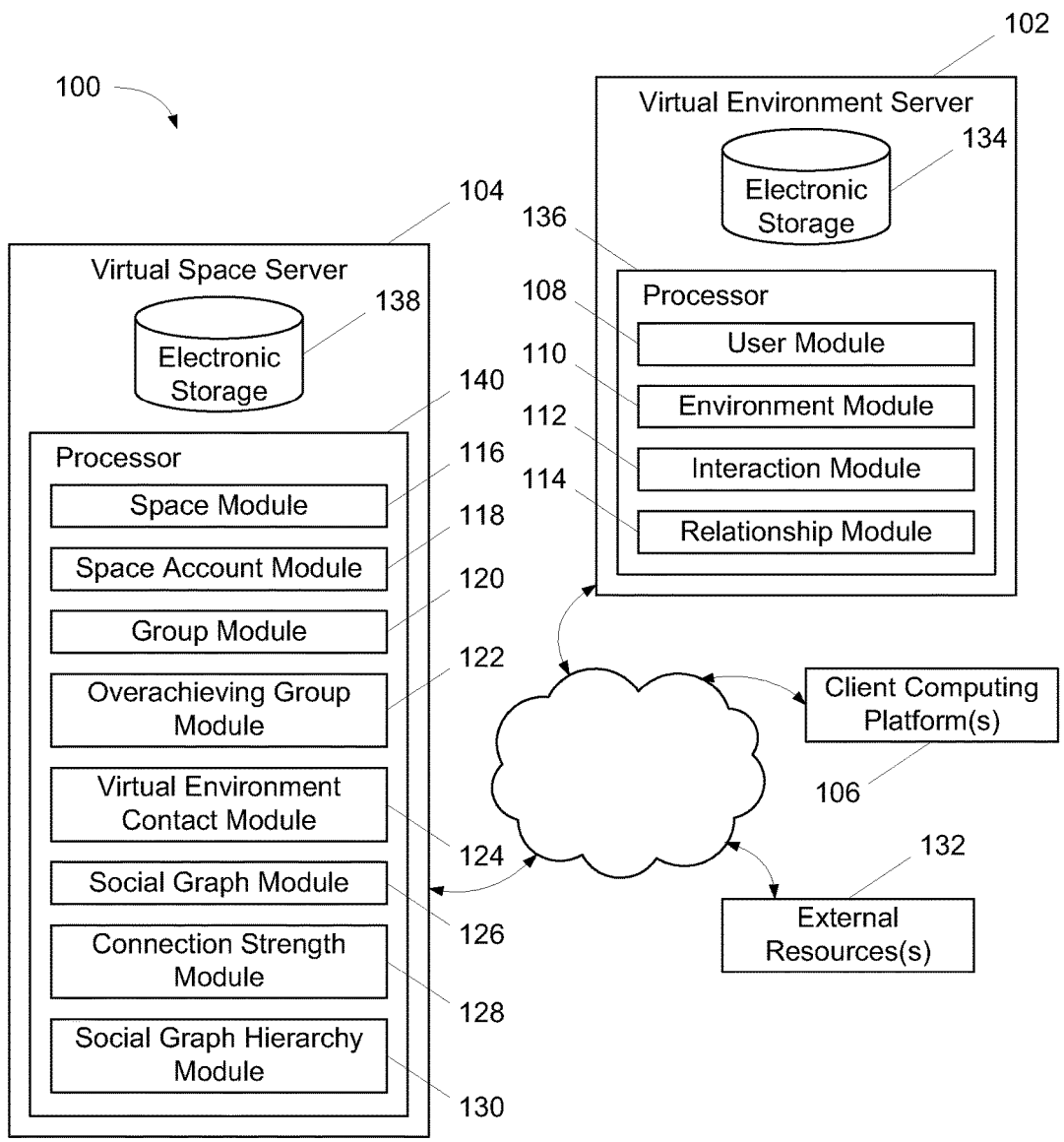
FIG. 1 illustrates a system configured to determine social graphs for individual users belonging to affiliations in virtual spaces accessible via virtual environments, in accordance with one or more implementations.

FIG. 1 illustrates a system 100 configured to determine social graphs for individual users belonging to affiliations in virtual spaces accessible via virtual environments, in accordance with one or more implementations. In exemplary implementations, a group of users may belong to an affiliation within a first virtual space. For example, the group of users may belong to an alliance within a social network game played in a social network virtual environment. The same affiliation may be "transported" to other virtual spaces such that the same group of users are affiliated in more that one virtual space. The affiliations in different virtual spaces, which include substantially the same group of users, may be encompassed by an overarching affiliation. Social graphs associated with individual users may be determined based on the affiliations within one or more virtual spaces as well as relationships within one or more electronic social networks and/or other virtual environments. In some implementations, social graphs associated with individual users may be determined based on the one or more overarching affiliations.

In some implementations, system 100 may include one or more of at least one virtual environment server 102, at least one virtual space server 104, and/or other components. The virtual environment server 102 and/or virtual space server 104 may be configured to communicate with one or more client computing platforms 106 according to a client/server architecture to provide the virtual environment and/or the virtual space to users via client computing platforms 106. The virtual space server 104 may be configured to interface with virtual environment server 102 to supplement the functionality provided to the users with respect to the virtual environment and/or the virtual space. For example, virtual space server 104 may interface with virtual environment server 102 via one or more application programming interfaces.

The virtual environment server 102 may be configured to execute one or more computer program modules. The computer program modules may include one or more of a user module 108, an environment module 110, an interaction module 112, a relationship module 114, and/or other modules.

The user module 108 may be configured to access and/or manage one or more user profiles and/or user information associated with users of system 100. The one or more user profiles and/or user information may include information stored by virtual environment server 102, virtual space server 104, one or more of the client computing platforms 106, and/or other storage locations. The user profiles may include, for example, information identifying users (e.g., a username or handle, a number, an identifier, and/or other identifying information) within the virtual environment, security login information (e.g., a login code or password), virtual environment account information, subscription information, virtual currency account information (e.g., related to currency held in credit for a user), relationship information (e.g., information related to relationships between users in the virtual environment), virtual environment usage information, demographic information associated with users, interaction history among users in the virtual environment, information stated by users, purchase information of users, browsing history of users, a client computing platform identification associated with a user, a phone number associated with a user, and/or other information related to users.

The environment module 110 may be configured to provide one or more virtual environments to users via client computing platforms 106. As used herein, a "virtual environment" may include one or more interactive, electronic social media, and/or other virtual environments. Interactive, electronic social media may include one or more of an electronic social network, a micro-blogging service, a blog service (or host), a messaging service, a message board, a forum, and/or other electronically distributed media that are scalable and enable interaction between the users. Some non-limiting specific examples of interactive, electronic social media may include the social network provided by Facebook™, the social network provided by MySpace™, the social network provided by Google+™, the social network provided by Qzone™, the social network provided by Foursquare®, the micro-blogging service provided by Twitter™, the virtual world provided by SecondLife®, the massively multi-player online game provided by World of Warcraft®, the file sharing service provided by Flickr®, Blogger, YouTube, PlayStation® Home, Xbox® Live, and/or other interactive, electronic social media.

The interaction module 112 may be configured to monitor interactions of the users with the virtual environment and/or each other within the virtual environment. This may include monitoring, for a given user, one or more of times at which the given user is logged in to the virtual environment, areas of the virtual environment the given user views or interacts with or in, other users the given user interacts with, the nature and/or content of interactions of the given user with other users, activities participated in within the virtual environment, level, powers, or skill attained in the virtual environment, inventory items obtained in the virtual environment, and/or other interactions of the given user with the virtual environment and/or other users. Some or all of the information generated by interaction module 112 in monitoring the interactions of the users may be stored to the user profiles managed by user module 108.

At a given time, interaction module 112 may determine a set of users that are currently engaged with the virtual environment and/or a set of users that are currently not engaged with the virtual environment. Being engaged with the virtual environment may refer to being logged in to the virtual environment, performing some action or interaction within the virtual environment within some period of time (e.g., the last 2 minutes), and/or other taking some other action indicating ongoing and contemporaneous engagement with the virtual environment.

The relationship module 114 may be configured to establish relationships between users within the virtual environment. Such relationships may include one or more of friendships, connections, followers, social links, and/or other relationships. The relationship module 114 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual environment, and/or one or more types of relationships that a social construct within the virtual environment that does not have a functional result.

The virtual space server 104 may be configured to execute one or more computer program modules. The computer program modules may include one or more of a space module 116, a space account module 118, a group module 120, an overarching group module 122, a virtual environment contact module 124, a social graph module 126, a connection strength module 128, a social graph hierarchy module 130, and/or other modules.

The space module 116 may be configured to provide one or more virtual spaces to users via client computing platforms 106. As used herein, a "virtual space" may include one or more social network games and/or other virtual spaces. A virtual space may be provided via a virtual environment provided by environment module 110 of virtual environment server 102. For example, a user may be required to be engaged in a virtual environment in order to engage in a virtual space. According to various implementations, one or more instances of a single given virtual space may be provided via one or more different virtual environments.

The space module 116 may determine views of the virtual space. The views may then be communicated (e.g., via streaming, via object/position data, and/or other information) from virtual space server 104 to client computing platforms 106 for presentation to users. The view determined and transmitted to a given client computing platform 106 may correspond to a user character being controlled by a user via the given client computing platform 106. The view determined and transmitted to a given client computing platform 106 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

An instance of a virtual space may comprise a simulated space that is accessible by users via clients (e.g., client computing platforms 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of virtual spaces are determined by space module 116 is not intended to be limiting. The space module 116 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of a virtual space executed by space module 116, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through virtual space server 104 and/or virtual environment server 102. Within the virtual space, users may participate in a game. The game may be an activity within the space (e.g., a virtual card or board game within the space), or the game may actually be the space (e.g., an online role-playing game, massively multiplayer online game, a social online game, and/or other games).

The space account module 118 may be configured to manage accounts associated with the individual users for individual virtual spaces. The accounts may include user information associated with the individual users. Such user information may include one or more of identification information; inventory information; financial information; relationship information; information related to the users determined by one or more of the other modules 116, 120, 122, 124, 126, 128, and/or 130; demographic information; usage information; past purchase history; and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds.

The group module 120 may be configured to a group module configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module 120 may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, group module 120 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space, and/or other capabilities among users belonging to an affiliation.

The overarching group module 122 may be configured to determine and/or manage one or more overarching affiliations. An overarching affiliation may encompass two or more affiliations from different virtual spaces that include substantially the same group of users. By way of non-limiting example, a given overarching affiliation may encompass an affiliation in one virtual space (e.g., a team) and an affiliation in another virtual space (e.g., a gang), where the two affiliations include substantially the same group of users. A given overarching affiliation may facilitate one or more of a cooperative attack, a cooperative defense, resource trading, troupe enforcements, and/or other actions carried out by a group in individual virtual spaces by individual users belonging to the given overarching affiliation. The group module 120 may be configured to automatically include a given user belonging to a given overarching affiliation in individual affiliations encompassed by the given overarching affiliation. A given user may be enabled to opt-in or opt-out of being automatically included in individual affiliations encompassed by an overarching affiliation.

The overarching group module 122 may be configured to link affiliations from different virtual spaces to yield an overarching affiliation. Such linking may be performed automatically, manually, and/or by a combination of automatic and manual operations. In some implementations, overarching group module 122 may monitor affiliations in two or more virtual spaces to determine affiliations including substantially the same group of users for inclusion in an overarching affiliation. A user belonging to affiliations in different virtual spaces may manually link the affiliations so as to be encompassed by an overarching affiliation. In some implementations, responsive to a first user joining a first affiliation in a first virtual space, the first user may be presented with an option to join one or more other affiliations in other virtual spaces that are encompassed by the same overarching affiliation as the first affiliation. Such an option may be presented even if the first user has not engaged one or more of the other virtual spaces, according to some implementations.

The virtual environment contact module 124 may be configured to manage relationships within one or more electronic social networks and/or other virtual environments. By way of non-limiting example, the relationships may comprise a first relationship within a first electronic social network between the first user and a third user. A given relationship within a given electronic social network or other virtual environment may represent a reciprocal relation between two or more users in the given electronic social network or other virtual network. In some implementations, virtual environment contact module 124 may be configured to communicate and/or otherwise interface with relationship module 114 of virtual environment server 102 to identify relationships within one or more electronic social networks and/or other virtual environments.

The social graph module 126 may be configured to determine social graphs associated with individual users based on the affiliations within the one or more virtual spaces and the relationships within the one or more electronic social networks and/or other virtual environments. Generally speaking, a social graph describes social connections between individuals. By way of non-limiting illustration, a given social graph associated with the first user may represent (1) a connection between the first user and the second user that corresponds to the first affiliation and (2) a connection between the first user and the third user that corresponds to the first relationship. In some implementations, social graph module 126 may be configured to determine social graphs associated with individual users based on the one or more overarching affiliations. In some implementations, social graph module 126 may be configured to provide a social graph interface for presentation to a user. Exemplary implementations of a social graph interface are described in connection with FIG. 2.

The connection strength module 128 may be configured to determine connection strengths of connections in social graphs based on factors associated with virtual spaces and factors associated with electronic social networks and/or other virtual environment. Exemplary factors are described below. A given connection strength of a given connection representing a relational strength between two users. By way of non-limiting example, a connection strength between the first user and the second user may be determined based on factors associated with the first virtual space, while a connection strength between the first user and the third user may be determined based on factors associated with the first electronic social network. As another example, where the first affiliation within the first virtual space further comprises a fourth user and where the relationships further comprise a second relationship within the first electronic social network between the first user and the fourth user, a connection strength between the first user and the fourth user may be determined based on factors associated with the first virtual space and factors associated with the first electronic social network.

Examples of factors associated with virtual spaces may include one or more of game mechanics, membership to common affiliations, time elapsed since joining an affiliation within a virtual space, privileges within a virtual space, leadership position in an affiliation in a virtual space, status within a virtual space, performance indicators associated with a virtual space, progress indicators associated with a virtual space, average communication frequency within a virtual space, a virtual goods inventory within a virtual space, time spent engaging a virtual space, and/or other factors associated with virtual spaces. Game mechanics may include rules of a game or gameplay associated with a virtual space. Privileges within a virtual space may include special capabilities within the gameplay of a virtual space, special capabilities associated with an affiliation and/or overarching affiliation, and/or other privileges associated with virtual spaces. Performance indicators associated with a virtual space may include an indication of a level of performance of a given user in the virtual space, which may be expressed as a score or other metric. Progress indicators associated with a virtual space may include an indication of a level of progress of a given user in gameplay of the virtual space. Average communication frequency within a virtual space may describe oftenness, regularity, and/or abundance of communications a given user is a party to within communication functionalities of the virtual space.

Examples of factors associated with electronic social networks and/or other virtual environments may include one or more of nature of a relationship within an electronic social network, time elapsed since forming a relationship within an electronic social network, privileges within an electronic social network, status within an electronic social network, average communication frequency within an electronic social network, a virtual goods inventory within an electronic social network, time spent engaging an electronic social network, and/or other factors associated with electronic social networks and/or other virtual environments. A nature of a relationship within an electronic social network may describe one or more of a familial relationship (e.g., sibling, parent, etc.), a social relationship (e.g., friend, teammate, etc.), a romantic relationship (e.g., boy/girl friend, spouse, etc.), a professional relationship (e.g., colleague, associate), and/or other interpersonal relationships. Privileges within an electronic social network may include special capabilities within and/or associated with the electronic social network. Average communication frequency within an electronic social network may describe oftenness, regularity, and/or abundance of communications a given user is a party to within communication functionalities of the electronic social network.

The social graph hierarchy module 130 may be configured to determine hierarchies associated with social graphs based on factors associated with virtual spaces and factors associated with electronic social networks and/or other virtual environments. For example, a hierarchy associated with a social graph of the first user may be determined based on factors associated with the first virtual space and factors associated with the first electronic social network. According to some implementations, a given hierarchy associated with a given social graph may represent a hierarchical order among connections of a given user.

In some implementations, virtual environment server 102, virtual space server 104, client computing platforms 106, one or more external resources 132, and/or other components of system 100 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual environment server 102, virtual space server 104, client computing platforms 106, external resources 132, and/or other components of system 100 may be operatively linked via some other communication media.

The virtual environment server 102 may comprise electronic storage 134, one or more processors 136, and/or other components. The virtual environment server 102 may include communication lines, or ports to enable the exchange of information with a network and/or other computing platforms. The processors 136 may be configured to execute computer program modules. The processors 136 may be configured to execute the computer program modules via one or more of hardware, software, and/or firmware. The computer program modules may include user module 108, environment module 110, interaction module 112, relationship module 114, and/or other computer program modules. Although system 100 may be described in certain sections herein as including virtual environment server 102, this is not intended to be limiting. The virtual environment server 102 may be separate and distinct from system 100, and may be provided by an entity that is separate from, for example, the entity providing virtual space server 104. In some implementations, the functionality attributed herein to virtual environment server 102 may be provided by virtual space server 104.

A given client computing platform 106 may include one or more processors configured to execute computer program modules. The computer program modules may be configured to enable an expert or user associated with the given client computing platform 106 to interface with virtual environment server 102, virtual space server 104, and/or other components of system 100, and/or provide other functionality attributed herein to client computing platforms 106. By way of non-limiting example, the given client computing platform 106 may include one or more of a desktop computer, a laptop computer, a handheld computer, a NetBook, a Smartphone, a gaming console, and/or other computing platforms.

The external resources 132 may include sources of information, hosts and/or providers of virtual environments and/or virtual spaces outside of system 100, external entities participating with system 100, and/or other resources. In some implementations, some or all of the functionality attributed herein to external resources 132 may be provided by resources included in system 100.

The virtual space server 104 may include electronic storage 138, one or more processors 140, and/or other components. The virtual space server 104 may include communication lines, or ports to enable the exchange of information with a network and/or other computing platforms. Illustration of virtual space server 104 in FIG. 1 is not intended to be limiting. The virtual space server 104 may include a plurality of hardware, software, and/or firmware components operating together to provide the functionality attributed herein to virtual space server 104. For example, virtual space server 104 may be implemented by a cloud of computing platforms operating together as virtual space server 104.

Electronic storage 138 may comprise electronic storage media that electronically stores information. The electronic storage media of electronic storage 138 may include one or both of system storage that is provided integrally (i.e., substantially non-removable) with virtual space server 104 and/or removable storage that is removably connectable to virtual space server 104 via, for example, a port (e.g., a USB port, a firewire port, etc.) or a drive (e.g., a disk drive, etc.). Electronic storage 138 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 138 may include one or more virtual storage resources (e.g., cloud storage, a virtual private network, and/or other virtual storage resources). Electronic storage 138 may store software algorithms, information determined by processor 140, information received from virtual environment server 102, information received from client computing platforms 106, and/or other information that enables virtual space server 104 to function as described herein.

Processor(s) 140 is configured to provide information processing capabilities in virtual space server 104. As such, processor 140 may include one or more of a digital processor, an analog processor, a digital circuit designed to process information, an analog circuit designed to process information, a state machine, and/or other mechanisms for electronically processing information. Although processor 140 is shown in FIG. 1 as a single entity, this is for illustrative purposes only. In some implementations, processor 140 may include a plurality of processing units. These processing units may be physically located within the same device, or processor 140 may represent processing functionality of a plurality of devices operating in coordination. The processor 140 may be configured to execute space module 116, space account module 118, group module 120, overarching group module 122, virtual environment contact module 124, social graph module 126, connection strength module 128, social graph hierarchy module 130, and/or other computer program modules. Processor 140 may be configured to execute modules 116, 118, 120, 122, 124, 126, 128, 130, and/or other modules by software; hardware; firmware; some combination of software, hardware, and/or firmware; and/or other mechanisms for configuring processing capabilities on processor 140.

It should be appreciated that although modules 116, 118, 120, 122, 124, 126, 128, and 130 are illustrated in FIG. 1 as being co-located within a single processing unit, in implementations in which processor 140 includes multiple processing units, one or more of modules 116, 118, 120, 122, 124, 126, 128, and/or 130 may be located remotely from the other modules. The description of the functionality provided by the different modules 116, 118, 120, 122, 124, 126, 128, and/or 130 described below is for illustrative purposes, and is not intended to be limiting, as any of modules 116, 118, 120, 122, 124, 126, 128, and/or 130 may provide more or less functionality than is described. For example, one or more of modules 116, 118, 120, 122, 124, 126, 128, and/or 130 may be eliminated, and some or all of its functionality may be provided by other ones of modules 116, 118, 120, 122, 124, 126, 128, and/or 130. As another example, processor 140 may be configured to execute one or more additional modules that may perform some or all of the functionality attributed below to one of modules 116, 118, 120, 122, 124, 126, 128, and/or 130.

Figure 2:
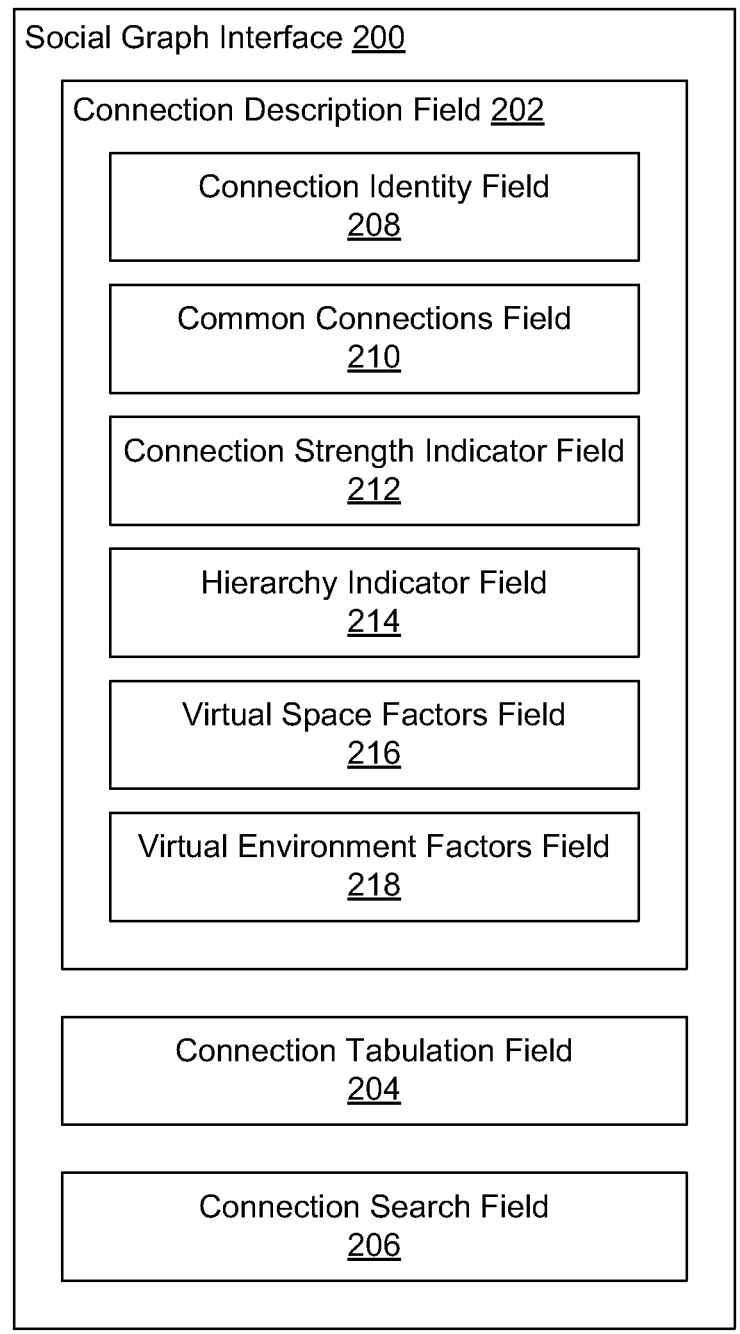
FIG. 2 illustrates social graph interface configured to enable a given user to manage information associated with a social graph of the given user, in accordance with one or more implementations.

FIG. 2 illustrates social graph interface 200 configured to enable a given user to manage information associated with a social graph of the given user, in accordance with one or more implementations. The social graph interface 200 may be presented to a given user via a client computing platform 106 associated with that user. The social graph interface 200 may be presented within a virtual environment provided by virtual environment server 102, within a virtual space provided by virtual space server 104, and/or outside of a virtual environment and/or virtual space. In some implementations, social graph interface 200 may be presented to a user via a mobile application on a mobile implementation of a client computing platform 106. The social graph interface 200 may be provided by social graph module 126 and/or one or more other modules included in system 100, other components of system 100, and/or other resources. As depicted in FIG. 2, social graph interface 200 includes a connection description field 202, a connection tabulation field 204, a connection search field 206, and/or other elements. The depiction of social graph interface 200 in FIG. 2 is not intended to be limiting as social graph interface 200 may include more or less elements than those shown. For example, one or more of elements shown in FIG. 2 may be eliminated, and some or all of its functionality may be provided by one or more other elements.

The connection description field 202 may be configured to present information associated with one or more individual connections in a social graph of a user. As depicted in FIG. 2, connection description field 202 may include one or more of a connection identity field 208, a common connections field 210, a connection strength indicator field 212, a hierarchy indicator field 214, a virtual space factors field 216, a virtual environment factors field 218, and/or other elements. The connection identity field 208 may be configured to present identifying information associated with a connection such as a name, image, and/or other identifying information. The common connections field 210 may be configured to identify users to which two given users are both connected. The connection strength indicator field 212 may be configured to present connection strengths, as determined by connection strength module 128. The hierarchy indicator field 214 may be configured to present hierarchy information, as determined by social graph hierarchy module 130. The virtual space factors field 216 may be configured to present one or more factors associated with a virtual space, as described in connection with FIG. 1. The virtual environment factors field 218 may be configured to present one or more factors associated with an electronic social network and/or other virtual environment, as described in connection with FIG. 1.

The connection tabulation field 204 may be configured to present condensed information associated with one or more individual connections in a social graph of a user. By way of non-limiting example, connection tabulation field 204 may present a list of names of connections in a social graph of a user. As another example, connection tabulation field 204 may present an array of facial images and/or profile images of connections in a social graph of a user.

The connection search field 206 may be configured to enable a given user to search connections associated with the given user. Such a search may be performed according to information associated with one or more users, one or more virtual spaces, one or more virtual environments, and/or other information. In some implementations, information associated with one or more search results may be presented by connection description field 202.

Figure 3:
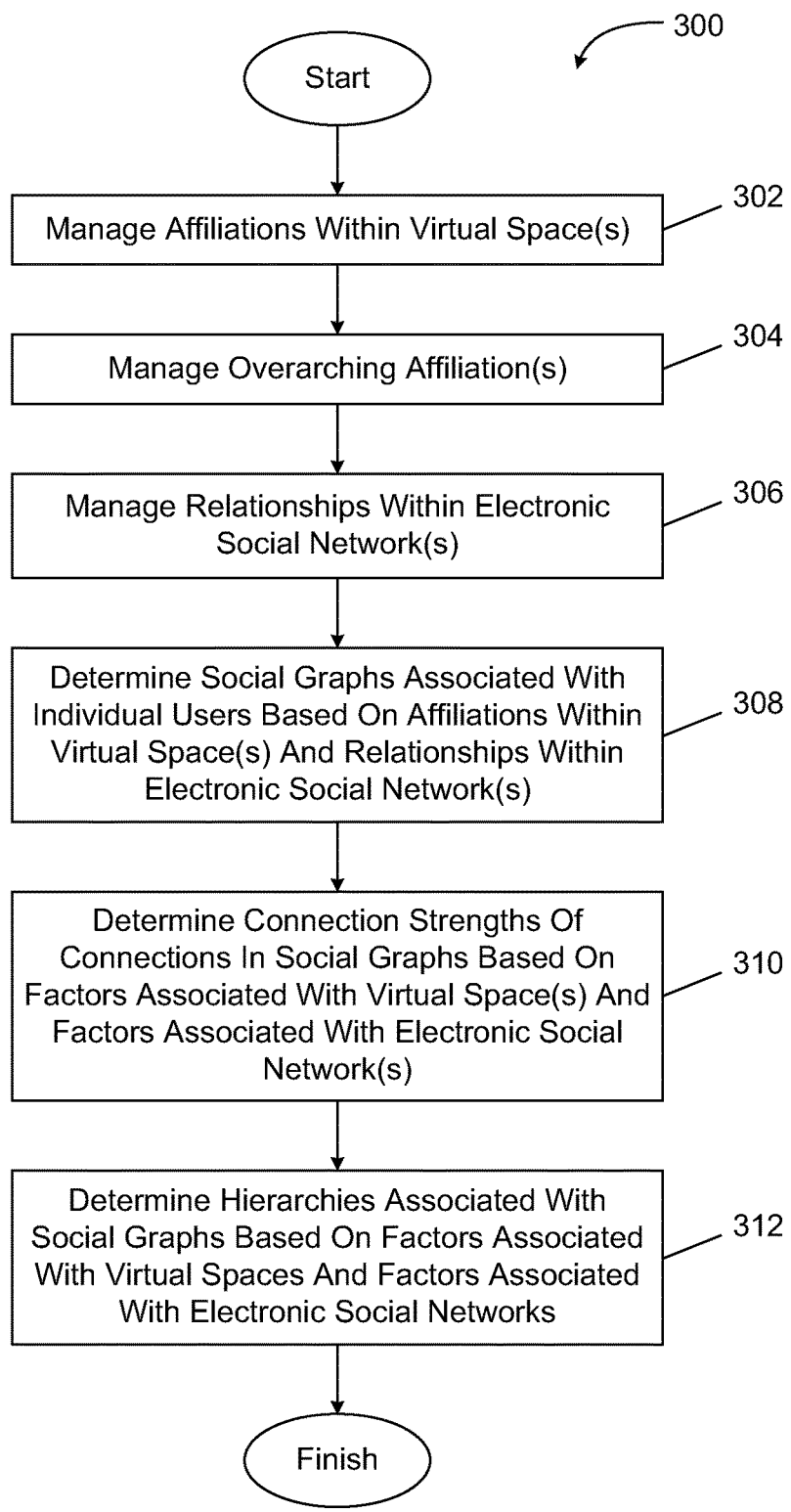
FIG. 3 illustrates a method for determining social graphs for individual users belonging to affiliations in virtual spaces accessible via virtual environments, in accordance with one or more implementations.

FIG. 3 illustrates a method 300 for determining social graphs for individual users belonging to affiliations in virtual spaces accessible via virtual environments, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, affiliations within one or more virtual spaces may be managed. A given affiliation within a given virtual space may include a discrete group of users with a relationship having a functional significance within the given virtual space. The affiliations may include a first affiliation within a first virtual space between a group of users including a first user and a second user. Operation 302 may be performed by a group module that is the same or similar to group module 120, in accordance with one or more implementations.

At an operation 304, one or more overarching affiliations may be managed. Individual ones of the overarching affiliations may encompass two or more affiliations from different virtual spaces that include substantially the same group of users. Operation 304 may be performed by an overarching group module that is the same or similar to overarching group module 122, in accordance with one or more implementations.

At an operation 306, relationships within one or more electronic social networks may be managed. A given relationship within a given electronic social network may represent a reciprocal relation between two or more users in the given electronic social network. The relationships may comprise a first relationship within a first electronic social network between the first user and a third user. Operation 306 may be performed by a virtual environment contact module that is the same or similar to virtual environment contact module 124, in accordance with one or more implementations.

At an operation 308, social graphs associated with individual users may be determined based on the affiliations within the one or more virtual spaces and the relationships within the one or more electronic social networks. A given social graph associated with the first user may represent (1) a connection between the first user and the second user that corresponds to the first affiliation and (2) a connection between the first user and the third user that corresponds to the first relationship. Operation 308 may be performed by a social graph module that is the same or similar to social graph module 126, in accordance with one or more implementation.

At an operation 310, connection strengths of connections in social graphs may be determined based on factors associated with virtual spaces and factors associated with electronic social networks. A given connection strength of a given connection may represent a relational strength between two users. A connection strength between the first user and second user may be determined based on factors associated with the first virtual space, while a connection strength between the first user and the third user may be determined based on factors associated with the first electronic social network. Operation 310 may be performed by a connection strength module that is the same or similar to connection strength module 128, in accordance with one or more implementations.

At an operation 312, hierarchies associated with social graphs may be determined based on factors associated with virtual spaces and factors associated with electronic social networks. A given hierarchy associated with a given social graph may represent a hierarchical order among connections of a given user. A hierarchy associated with a social graph of the first user may be determined based on factors associated with the first virtual space and factors associated with the first electronic social network. Operation 312 may be performed by a social graph hierarchy module that is the same or similar to social graph hierarchy module 130, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine social graphs for individual users belonging to affiliations in virtual spaces accessible via electronic social networks, the system comprising:
    a non-transitory storage medium configured to store information; and
    one or more processors configured by machine-readable instructions to:
        manage affiliations within one or more online games that take place in one or more virtual spaces, a given affiliation within a given online game comprising a discrete group of three or more users with a relationship having a functional impact on cooperative gameplay between the users within the given online game, wherein the affiliations comprise a first affiliation within a first online game between a group of users including a first user, a second user, and a third user;
        manage one or more overarching affiliations, individual ones of the overarching affiliations encompassing two or more affiliations from different online games that include substantially the same group of users;
        manage relationships within one or more electronic social networks, a given relationship within a given electronic social network representing a reciprocal relationship between two or more users in the given electronic social network in which at least one of the two or more users has sent a request to other users to form a connection on a given electronic social network and where at least one of the other users has accepted the request, wherein the relationships comprise a first relationship within a first electronic social network between the first user and a fourth user; and
        determine social graphs associated with individual users based on the affiliations within the one or more online games, the relationships within the one or more electronic social networks, and the one or more overarching affiliations, a given social graph associated with the first user representing (1) a connection between the first user and the second user that corresponds to the first affiliation within the first online game, (2) a connection between the first user and the third user that corresponds to the first affiliation within the first online game, and (3) a connection between the first user and the fourth user that corresponds to the first relationship in the first electronic social network.

2. The system of claim 1, wherein the one or more processors are further configured by machine-readable instructions to determine connection strengths of connections in social graphs based on factors associated with online games and factors associated with electronic social networks, a given connection strength of a given connection representing a relational strength between two users, wherein a connection strength between the first user and the second user is determined based on factors associated with the first online game, and wherein a connection strength between the first user and the fourth user is determined based on factors associated with the first electronic social network.

3. The system of claim 2, wherein the factors associated with online games include one or more of game mechanics, membership to common affiliations, time elapsed since joining an affiliation within an online game, privileges within an online game, leadership position in an affiliation in an online game, status within an online game, performance indicators associated with an online game, progress indicators associated with an online game, average communication frequency within an online game, a virtual goods inventory within an online game, or time spent engaging an online game.

4. The system of claim 2, wherein the factors associated with electronic social networks include one or more of nature of a relationship within an electronic social network, time elapsed since forming a relationship within an electronic social network, privileges within an electronic social network, status within an electronic social network, average communication frequency within an electronic social network, a virtual goods inventory within an electronic social network, or time spent engaging an electronic social network.

5. The system of claim 2, wherein the first affiliation within the first online game further comprises a fifth user, wherein the relationships further comprise a second relationship within the first electronic social network between the first user and the fifth user, and wherein the one or more processors are further configured by machine-readable instructions to determine a connection strength between the first user and the fifth user based on factors associated with the first virtual space and factors associated with the first electronic social network.

6. The system of claim 1, wherein the one or more processors are further configured by machine-readable instructions to determine hierarchies associated with social graphs based on factors associated with online games and factors associated with electronic social networks, a given hierarchy associated with a given social graph representing a hierarchical order among connections of a given user, wherein a hierarchy associated with a social graph of the first user is determined based on factors associated with the first online game and factors associated with the first electronic social network.

7. A method for determining social graphs for individual users belonging to affiliations in virtual spaces accessible via electronic social networks, the method comprising:
    managing affiliations within one or more online games that take place in one or more virtual spaces, a given affiliation within a given online game comprising a discrete group of three or more users with a relationship having a functional impact on cooperative gameplay between the users within the given online game, wherein the affiliations comprise a first affiliation within a first online game between a group of users including a first user, a second user, and a third user;
    managing one or more overarching affiliations, individual ones of the overarching affiliations encompassing two or more affiliations from different online games that include substantially the same group of users;
    managing relationships within one or more electronic social networks, a given relationship within a given electronic social network representing a reciprocal relationship between two or more users in the given electronic social network in which at least one of the two or more users has sent a request to other users to form a connection on a given electronic social network and where at least one of the other users has accepted the request, wherein the relationships comprise a first relationship within a first electronic social network between the first user and a—fourth user; and determining social graphs associated with individual users based on the affiliations within the one or more online games, the relationships within the one or more electronic social networks, and the one or more overarching affiliations, a given social graph associated with the first user representing (1) a connection between the first user and the second user that corresponds to the first affiliation within the first online game, (2) a connection between the first user and the third user that corresponds to the first affiliation within the first online game, and (3)—a connection between the first user and the—fourth user that corresponds to the first relationship in the first electronic social network.

8. The method of claim 7, further comprising determining connection strengths of connections in social graphs based on factors associated with online games and factors associated with electronic social networks, a given connection strength of a given connection representing a relational strength between two users, wherein a connection strength between the first user and the second user is determined based on factors associated with the first online game, and wherein a connection strength between the first user and the fourth user is determined based on factors associated with the first electronic social network.

9. The method of claim 8, wherein the factors associated with online games include one or more of game mechanics, membership to common affiliations, time elapsed since joining an affiliation within an online game, privileges within an online game, leadership position in an affiliation in an online game, status within an online game, performance indicators associated with an online game, progress indicators associated with an online game, average communication frequency within an online game, a virtual goods inventory within an online game, or time spent engaging an online game.

10. The method of claim 8, wherein the factors associated with electronic social networks include one or more of nature of a relationship within an electronic social network, time elapsed since forming a relationship within an electronic social network, privileges within an electronic social network, status within an electronic social network, average communication frequency within an electronic social network, a virtual goods inventory within an electronic social network, or time spent engaging an electronic social network.

11. The method of claim 8, further comprising determining a connection strength between the first user and a fifth user based on factors associated with the first online game and factors associated with the first electronic social network, wherein the first affiliation within the first online game further comprises the fifth user, and wherein the relationships further comprise a second relationship within the first electronic social network between the first user and the fifth user.

12. The method of claim 7, further comprising determining hierarchies associated with social graphs based on factors associated with online games and factors associated with electronic social networks, a given hierarchy associated with a given social graph representing a hierarchical order among connections of a given user, wherein a hierarchy associated with a social graph of the first user is determined based on factors associated with the first online game and factors associated with the first electronic social network.

* * * * *